Oct. 31, 1961 E. LOEB 3,006,834
IRRADIATION FACILITY
Filed Dec. 12, 1958 2 Sheets-Sheet 1

INVENTOR.
ERNEST LOEB
BY H. Fredrick Hamann
ATTORNEY

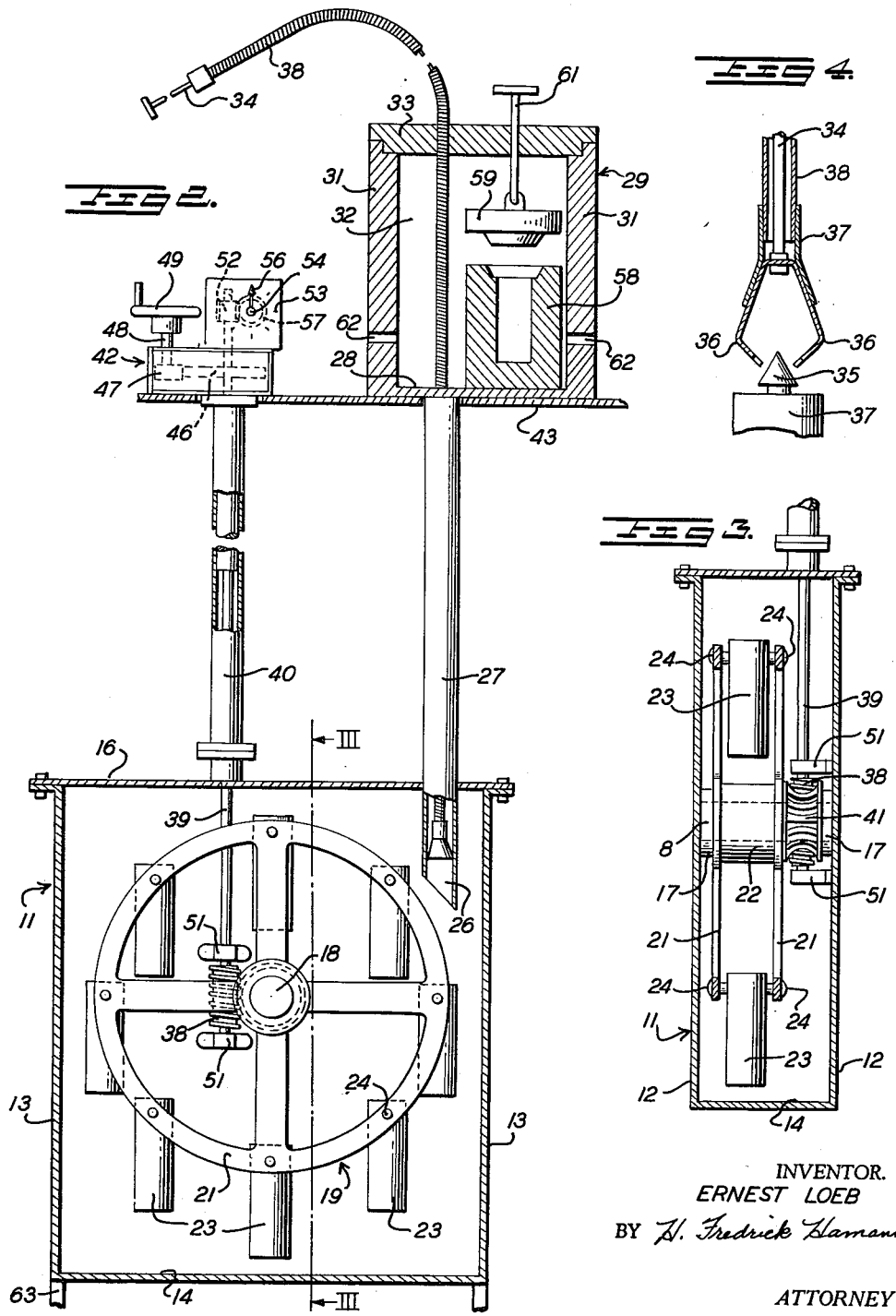

United States Patent Office 3,006,834
Patented Oct. 31, 1961

3,006,834
IRRADIATION FACILITY
Ernest Loeb, Silver Spring, Md., assignor, by mesne assignments, to Allis-Chalmers Manufacturing Company, a corporation of Delaware
Filed Dec. 12, 1958, Ser. No. 780,044
5 Claims. (Cl. 204—193.2)

This invention relates to irradiation facilities for nuclear reactors and, more particularly, to a portable dry irradiation facility for swimming pool reactors.

In pool reactors, the reactor core is usually suspended from a movable bridge into an open pool of water which serves as a coolant, moderator, shield and reflector. The pool is generally provided with a stall area separated from a bulk shield experimental area by means of a removable gate, the stall area being provided with beam tubes and a thermal column for conducting irradiation experiments.

An object of the present invention resides in the provision of a portable irradiation facility adapted to be positioned adjacent a reactor core of a swimming pool reactor to receive samples to be tested.

Another object of the invention resides in the provision of a dry irradiation facility provided with a plurality of holders adapted to receive test samples.

A further object of the invention resides in the provision of means for inserting samples into the several holders for irradiation tests and for selectively removing the samples from their respective holders after testing.

Another object of the invention resides in the provision of an irradiation facility comprising a plurality of sample holders mounted on the rim of a rotatable wheel for movement into registry with a sample loading and unloading device manually operable from above the reactor pool.

Another object of the invention resides in the provision of means for rotating the holder supporting wheel to move the holders into registry with the sample loading and unloading device.

The invention embodies other novel features, details of construction and management of parts which are hereinafter set forth in the specification and claims and illustrated in the accompanying drawings, forming part thereof, wherein:

FIG. 2 is a front elevation, partly in section, showing the irradiation facility.

FIG. 3 is a section taken along the line III—III of FIG. 2.

FIG. 4 is an enlarged fragmentary section illustrating the sample grasping tool.

Figure 1:
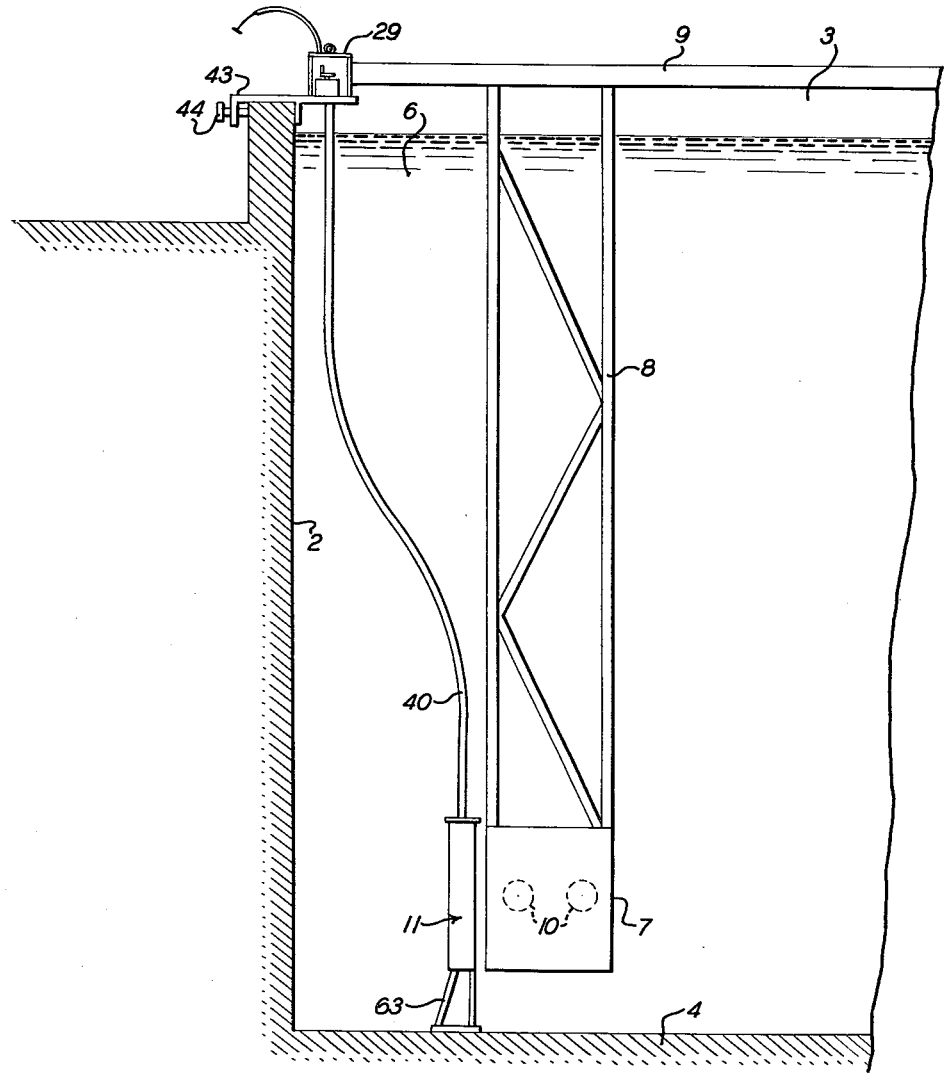
FIG. 1 is a fragmentary vertical section of a swimming pool reactor provided with an irradiation facility embodying features of the invention.

Referring now to the drawings for a better understanding of the invention, the irradiation facility is shown as mounted for use within a pool type nuclear reactor comprising side walls 2—2, end walls 3—3, and a bottom 4 arranged to define a swimming pool to receive a body of water 6. Reactors of this type are usually provided with a movable gate (not shown) extending upwardly from the bottom 4 and between the side walls 2—2 to define a stall section and a bulk shield section. A reactor core 7 of fissionable fuel elements is suspended by means of a tower 8 from a bridge 9 mounted on rails (not shown) on the side walls 2—2 for horizontal movement to dispose the core within either the stall section or bulk shield section of the pool. A thermal column and beam ports 10 are provided in the stall section for conducting irradiation experiments.

During operation of a conventional pool reactor of the type shown and described, it is desirable to conduct irradiation experiments on numerous small samples. As the number of experiments which may be conducted simultaneously in a pool type reactor is limited by the number of conventional facilities, the present invention contemplates the provision of a portable irradiation facility adapted to receive a plurality of test samples for dry irradiation experiments adjacent the reactor core.

The portable irradiation facility is shown in FIGS. 2 and 3 as comprising a housing 11 having side walls 12—12, end walls 13—13, a bottom 14, and a removable cover 16. Bearings 17—17 are secured to the inner surfaces of the side walls 12—12 to receive opposite ends of an axle 18 fixed on a wheel 19. The wheel comprises axially spaced disks 21—21 secured to opposite ends of a hub 22 which, in turn, is secured to the axle 18.

A plurality of cup-shape sample holders 23 are provided at their open ends with trunnions 24 journaled in openings formed in the disks 21—21, whereby the holders remain upright during rotation of the wheel. A guide nozzle 26 secured to the cover 16 is connected to one end of a flexible conduit 27 which has its other end secured within an opening in the bottom 28 of a sample transfer box 29. The box 29 is preferably formed of lead and comprises side walls 31—31, end walls 32—32 and a removable cover 33.

A sample loading and unloading tool is shown as comprising a flexible cable 34 secured at its lower end to a pair of jaws 36 formed of thin resilient strip material and normally disposed in their open position. The jaws 36 are engaged within a bell-shape housing 37 secured to one end of a flexible tube 38 which receives the cable 34. The tube 38 and cable 34 extend upwardly through the conduit 27 and cover 33 for manual operation, whereby movement of the cable through the tube acts to move the jaws 36 either into or out of engagement with a button head 35 on a sample 37.

The several sample holders 23 are movable into and out of registry with the sample guide nozzle 26 by suitable drive means shown as a manually operable wheel rotating mechanism comprising a worm gear 38 secured to a flexible drive shaft 39 for meshing engagement with a worm 41 secured to the wheel axle 18. The drive shaft 39 extends upwardly through a flexible conduit 40 into a gear box 42. The transfer box 29 and gear box 42 are adapted to be mounted on a common support member 43 detachably secured to the wall 2 by means of a screw 44. A gear 46 secured to the drive shaft 39 is driven by a pinion 47 secured to a shaft 48 provided with a handwheel 49. The worm 41 is journaled for rotational and non-axial movement in bearings 51—51 secured to a side wall 12.

A worm 52 is secured to the drive shaft 39 for engagement with a worm gear 53 secured to a shaft 54 journaled in the gear box 42. A pointer 56 is secured to the shaft 54 outside the gear box for registry with a calibrated dial 57 secured to the outside of the gear box to indicate to the operator the positions of the several holders with respect to the guide nozzle 26.

A lead casket 58 is provided in the transfer box 29 for lateral movement under a sample lifted from a holder 23 to a position adjacent the cover 33. After the sample has been placed in the casket, the casket is moved back to its original position to receive a cover 59 engaged by a removable hook member 61 which extends through an opening in the cover 33. The casket 58 is movable laterally by means of a rod insertable through apertures 62 provided in the side walls 31—31 of the box 29. The housing 11 is supported for alignment with one of the faces of the core 7 by means of legs 63.

Having described a preferred embodiment of the present invention, it is to be understood that although specific terms and examples are employed, they are used in a generic and descriptive sense and not for purposes of limitation; the scope of the invention being set forth in the following claims:

What is claimed is:

1. In a portable irradiation facility for a nuclear reactor having a core of fuel elements submerged in a pool of water, a housing to be positioned adjacent said core, a wheel journaled within said housing, sample holders pivotally mounted on said wheel, transfer means to move samples into and out of said holders, and actuating means to rotate said wheel to position a selected holder in registry with said transfer means, said transfer means comprising a transfer box adapted to contain a casket to receive an irradiated sample, a conduit connecting said housing to said transfer box, and means to move said samples through said conduit between said transfer box and said sample holders.

2. In a portable irradiation facility for a nuclear reactor having a core of fuel elements submerged in a pool of water, a housing to be positioned adjacent said core, a wheel journaled within said housing, sample holders pivotally mounted on said wheel, transfer means to move samples into and out of said holders, and actuating means to rotate said wheel to position a selected holder in registry with said transfer means, said transfer means comprising a transfer box adapted to contain a casket to receive an irradiated sample, a conduit leading from said housing to said transfer box, and a sample grasping device movable through said conduit.

3. In a portable irradiation facility for a nuclear reactor having a core of fuel elements submerged in a pool of water, a housing to be positioned adjacent said core, a wheel journaled within said housing, sample holders pivotally mounted on said wheel, transfer means to move samples into and out of said holders, and actuating means to rotate said wheel to position a selected holder in registry with said transfer means, said transfer means comprising a transfer box adapted to contain a casket to receive an irradiated sample, a conduit leading from said housing to said transfer box, and a sample grasping device movable through said conduit, said device comprising a pair of jaws secured to a cable, a tube enclosing said cable, and means to actuate said jaws responsive to axial movement of said cable relative to said tube.

4. In a portable irradiation facility for a nuclear reactor having a core of fuel elements submerged in a pool of water, a housing to be positioned adjacent said core, a wheel journaled within said housing, sample holders pivotally mounted on said wheel, transfer means to move samples into and out of said holders, and actuating means to rotate said wheel to position a selected holder in registry with said transfer means, said transfer means comprising a transfer box adapted to contain a casket to receive an irradiated sample, a conduit leading from said housing to said transfer box, and a sample grasping device movable through said conduit, said device comprising a pair of resilient jaws secured to a cable, a tube enclosing said cable, and cam means to actuate said jaws responsive to axial movement of said cable relative to said tube.

5. In a portable irradiation facility for a nuclear reactor having a core of fuel elements submerged in a pool of water, a housing to be positioned adjacent said core, a wheel journaled within said housing, sample holders pivotally mounted on said wheel, transfer means to move samples into and out of said holders, and actuating means to rotate said wheel to position a selected holder in registry with said transfer means, said transfer means comprising a transfer box adapted to contain a casket to receive an irradiated sample, a conduit connecting said housing to said transfer box, and means to move said sample through said conduit between said sample holder and said transfer box, said actuating means comprising remotely disposed drive means having position indicating means associated therewith, and means to support said drive means and transfer box on the reactor above the pool of water.

References Cited in the file of this patent

UNITED STATES PATENTS

| | | |
|---|---|---|
| 204,307 | Duff | May 28, 1878 |
| 1,398,134 | Landon | Nov. 22, 1921 |